US011885476B2

(12) United States Patent
Coquelle et al.

(10) Patent No.: US 11,885,476 B2
(45) Date of Patent: Jan. 30, 2024

(54) ILLUMINATING PANEL INTEGRATED INTO A TRAVERSABLE SURFACE

(71) Applicants: COLAS, Paris (FR); COMMISSARIAT A L'ENERGIE ATOMIQUE ET AUX ENERGIES ALTERNATIVES, Paris (FR)

(72) Inventors: Eric Coquelle, Versailles (FR); Issam Hasnaoui, Boulogne-Billancourt (FR); Rémi De Bettignies, Grenoble (FR)

(73) Assignees: COLAS, Paris (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/767,827

(22) PCT Filed: Oct. 7, 2020

(86) PCT No.: PCT/EP2020/078133
§ 371 (c)(1),
(2) Date: Apr. 8, 2022

(87) PCT Pub. No.: WO2021/069499
PCT Pub. Date: Apr. 15, 2021

(65) Prior Publication Data

US 2022/0412519 A1 Dec. 29, 2022

(30) Foreign Application Priority Data

Oct. 10, 2019 (FR) ....................................... 1911284

(51) Int. Cl.
*F21S 8/02* (2006.01)
*E01F 9/559* (2016.01)
(Continued)

(52) U.S. Cl.
CPC .............. *F21S 8/022* (2013.01); *E01C 17/00* (2013.01); *E01F 9/559* (2016.02); *E01F 9/582* (2016.02);
(Continued)

(58) Field of Classification Search
CPC . E01F 9/582; E01F 9/559; E01C 17/00; F21S 8/032; F21S 8/022
See application file for complete search history.

(56) References Cited

U.S. PATENT DOCUMENTS

| | | | | |
|---|---|---|---|---|
| 9,920,921 | B2 * | 3/2018 | Furmanek | F21V 33/006 |
| 2020/0240094 | A1 * | 7/2020 | Soulima | E01C 17/00 |
| 2022/0136179 | A1 * | 5/2022 | Heslinga | E01F 9/559 136/244 |

FOREIGN PATENT DOCUMENTS

| | | |
|---|---|---|
| FR | 3 063 128 A1 | 8/2018 |
| WO | 2011/096822 | 8/2011 |

(Continued)

OTHER PUBLICATIONS

International Search Report for PCT/EP2020/078133, dated Dec. 18, 2020, 5 pages (with English Translation).
Written Opinion of the ISA for PCT/EP2020/078133, dated Dec. 18, 2020, 8 pages.

*Primary Examiner* — Evan P Dzierzynski
*Assistant Examiner* — Nathaniel J Lee
(74) *Attorney, Agent, or Firm* — NIXON & VANDERHYE

(57) ABSTRACT

Disclosed is an illuminating panel, in particular integrated into a traversable surface, including, in succession, a first protective film arranged on the front face of the device, a first exterior encapsulating film, an interior encapsulating film, a second exterior encapsulating film, and a second protective film arranged on the rear face of the device, one of the films chosen from among the first exterior encapsu-
(Continued)

lating film, the interior encapsulating film and the second exterior encapsulating film coating at least one active element suitable for emitting light. Also disclosed is a method for producing such a panel and a functional traversable surface with such a panel.

20 Claims, 6 Drawing Sheets

(51) Int. Cl.

| | |
|---|---|
| ***E01C 17/00*** | (2006.01) |
| ***E01F 9/582*** | (2016.01) |
| ***F21S 8/00*** | (2006.01) |
| *F21Y 115/10* | (2016.01) |
| *F21W 111/02* | (2006.01) |

(52) U.S. Cl.

CPC .......... *F21S 8/032* (2013.01); *F21W 2111/02* (2013.01); *F21Y 2115/10* (2016.08)

(56) References Cited

FOREIGN PATENT DOCUMENTS

| | | | | |
|---|---|---|---|---|
| WO | 2013/017410 | 2/2013 | | |
| WO | 2016/016484 | 2/2016 | | |
| WO | 2018/150144 | 8/2018 | | |
| WO | WO-2018150145 A1 * | 8/2018 | ............. | E01C 17/00 |
| WO | WO-2020174177 A1 * | 9/2020 | ............. | E01C 11/00 |

* cited by examiner

ILLUMINATING PANEL INTEGRATED INTO A TRAVERSABLE SURFACE

This application is the U.S. national phase of International Application No. PCT/EP2020/078133 filed Oct. 7, 2020, which designated the U.S. and claims priority to FR Patent Application No. 1911284 filed Oct. 10, 2019, the entire contents of each of which are hereby incorporated by reference.

TECHNICAL FIELD

The present invention relates to the technical filed of functionalized trafficable pavements, in particular with light elements.

PRIOR ART

In the above field, it is known to integrate in commercial devices active elements such as light-emitting diodes (LEDs), an energy storage and a power source, for example a photovoltaic element. These devices generally have a significant thickness that makes them unsuitable for use over a large surface area, and an elementary size that does not exceed ten centimetres and that intends them for punctual delimitation.

Also known are devices comprising light elements requiring embedding in the pavement, which may for example comprise the light elements within a several centimetre thick matrix. These devices are hardly compatible with integration into existing pavements.

It would be advantageous to have devices integrating light elements, able to be integrated into an existing trafficable pavement without embedding, making it possible to cover a large surface area, integrating with the existing road markings, and whose ignition would allow the formation of desired patterns, for example by a remote control.

The application FR3063128 describes a light signalling slab comprising a multi-layer structure and light-emitting diodes (LEDs) in the form of LED strips. Given the nature of the materials used for the different layers and the arrangement thereof, the properties of mechanical strength and/or resistance to climatic phenomena of the slab can be enhanced. Moreover, when the slab comprises several LED strips, these latter have to be connected by welds, which both represent potential points of weakness in terms of mechanical strength and complicate the slab manufacturing.

It this context, the Applicants have developed a light slab making it possible to overcome the shortcomings of the prior devices, the slab comprising light elements connected to each other, having a great thermomechanical stability, able to adhere to the pavement surface by integrating with the existing marking, and usable to display a wide variety of patterns in terms of shape, size and colour, in particular.

DISCLOSURE OF THE INVENTION

The first object of the invention is a light slab, in particular integrable into a trafficable pavement, comprising successively:

- a first protective film, arranged on the front face of the device, made of a first material,
- a first external encapsulating film, made of a second material,
- an internal encapsulating film, made of a third material,
- a second external encapsulating film, made of a fourth material,

- a second protective film, arranged on the rear face of the device, made of a fifth material,
- one of the films, chosen among the first external encapsulating film, the internal encapsulating film and the second external encapsulating film, coating at least one active element adapted to emit light,
- each active element adapted to emit light comprising at least one light element on a support allowing it to be powered,
- the first material, the second material, the third material, the fourth material and the fifth material having Young's moduli $E_1$, $E_2$, $E_3$, $E_4$ and $E_5$, respectively, and coefficients of thermal expansion $CTE_1$, $CTE_2$, $CTE_3$, $CTE_4$ and $CTE_5$, respectively,
- $E_1$ and $E_5$ being similar or identical, $E_2$ and $E_4$ being similar or identical,
- $E_1 > E_2$ and $E_4 < E_5$,
- $CTE_1$ and $CTE_5$ being similar or identical, $CTE_2$ and $CTE_4$ being similar or identical,
- $CTE_1 < CTE_2$ and $CTE_4 > CTE_5$.

By "similar", it is meant in the present invention that the values differ by no more than 30%, preferably no more than 20%, in particular no more than 10%. Advantageously, the values are identical.

The layers of the light slab according to the invention form a stack that has:

- a U-shaped Young's modulus gradient: decreasing from the first protective film (front face) to the external encapsulating layer, and advantageously to the internal encapsulating layer, then increasing from the external encapsulating layer, advantageously from the internal encapsulating layer, to the second protective film (rear face);
- an inverted U-shaped coefficient of thermal expansion gradient: increasing from the first protective film (front face) to the external encapsulating layer, and advantageously to the internal encapsulating layer, then decreasing from the external encapsulating layer, advantageously from the internal encapsulating layer, to the second protective film (rear face);
- symmetrical or quasi-symmetrical thermomechanical properties (Young's modulus and coefficient of thermal expansion) with respect to the central layer of the stack of layers, i.e. the internal encapsulating layer. This symmetry or quasi-symmetry ensures that any stresses eventually present within the stack of layers cancel out two by two by mirror effect, guaranteeing a good thermomechanical stability of the assembly.

An assembly with such thermomechanical characteristics has a flat appearance that can be maintained over a wide temperature range, notably from −40° C. to +85° C. This range includes all or almost all the temperatures to which roads may be exposed.

The number, nature and/or relative position of the active elements of the slab may be adapted so that the light emitted by the light slab forms a desired pattern.

Thereafter, even if the description refers to a light slab comprising LEDs mounted on a printed circuit, the invention is transposable to any active element adapted to emit light and whose size allows it to be incorporated into the films of the light slab of the present invention.

The first protective film and/or the second protective film allow the mechanical protection of the light slab, in particular the active elements of the light slab. Advantageously, the Young's moduli $E_1$ and/or $E_5$ of the first and/or fifth materials are, independently from each other, higher than 2 GPa, preferably higher than 5 GPa, and even more preferentially higher than 10 GPa. Advantageously, the coefficients of thermal expansion $CTE_1$ and/or $CTE_5$ of the first and/or fifth materials are independently lower than $200\times10^{-6}$/K, preferably lower than $100\times10^{-6}$/K and even more preferentially lower than $50\times10^{-6}$/K.

The active elements are mechanically protected, in particular in case of mechanical impact or presence of a heavy load on the device, in particular after application on a trafficable pavement. By way of non-limiting illustration, the mechanical impacts may be a punching through the rear face of the device (by asperities of the underlying trafficable pavement); punching through the front face of the device due to the traffic; mechanical shock on the front face (for example, by impact of hailstones or falling of objects); compression of the device through the front face due to the traffic, the presence of a dead weight, or a falling mass; shear. The active elements are not degraded, their performance and/or functionality remain intact. In particular, this avoid the active element brightness to be deteriorated and/or reduced.

Unless otherwise specified, the Young's moduli and coefficients of thermal expansion values are given at ambient temperature, from 20 to 25° C.

The first and fifth materials may be, independently from each other, any material suited to mechanically protect the light slab, in particular the active elements adapted to emit light contained therein.

The first material must further be at least partially translucent, or even transparent, in order to at least partially let through the light emitted by the active elements. In certain embodiments, the first protective film may be made opaque in certain areas in order to allow the passage of the light emitted by the active elements so as to form a desired pattern. For example, certain areas of the first protective film may be painted, in a stencil style, to modulate the transmission of the light through these areas, for example to make them opaque. This makes it possible in particular to achieve, by masking, the illumination of specific patterns such as pictograms in particular, without having to produce specific electronic circuits.

Advantageously, the first and fifth materials are identical. The first and/or fifth materials may in particular independently comprise a resin such as an acrylic resin, in particular a Verniroc base, an epoxy resin or a polyurethane resin. The resin dosage may be comprised between 10 g/m$^2$ and 1000 g/m$^2$, better between 30 g/m$^2$ and 700 g/m$^2$, ideally between 150 g/m$^2$ and 600 g/m$^2$.

The first and fifth materials may further comprise a coloured substance such as a white Griffon road paint, $TiO_2$ pigments or a yellow paint.

The first material may further comprise transparent or coloured texturing elements, for example glass grains and/or beads, of a size comprised between for example 0.01 mm and 4 mm, better between 0.1 mm and 2 mm, ideally between 0.2 mm and 1.8 mm. The dosage of these glass grains and/or beads may be comprised between 10 and 800 g/m$^2$, better between 30 and 500 g/m$^2$, ideally between 50 and 400 g/m$^2$. The colorimetry may be measured according to the standards NF EN 1436:2018, and be inscribed in the RGB perimeter of a marking, for example the standard NF EN 1436+A1 for a white road marking. Such dosages ensure a grip that can be measured according to the standard NF EN EN13036-4, with an SRT pendulum, and provide a value higher than 0.45, and ideally higher than 0.55. These same dosages prevent any excessive loss of material, evaluated with Wehner & Schulze type polishing or skid-resistance machines, or rutting type traffic simulators.

The fifth material may comprise a resin chosen in the group consisted by an epoxy resin filled with glass fibres, a polypropylene resin, a polyethylene resin and a polyethylene terephthalate resin possibly filled with fibres.

The first and/or fifth materials may comprise a composite comprising glass fibres and an epoxy resin.

The thickness of the first protective film and/or the second protective film may be independently comprised between 0.1 mm and 5.0 mm, better between 0.25 mm and 3.0 mm, preferably between 0.4 mm and 1.5 mm, ideally between 0.5 m and 1.0 mm. In a particular embodiment, the thickness of the first and/or second protective film is substantially 400 μm (micrometres).

The first protective film may comprise a transparent or translucent resin and irregular texturing elements offering a certain grip, including in wet conditions.

The second protective film may comprise at least one hole allowing the passage of the power supply between the exterior of the slab and the active elements. In certain embodiments, this hole may be at least partially filled with the third material (of the internal encapsulating film).

The external first encapsulating film and/or second encapsulating film provide mechanical protection, and especially against water, to the active elements.

Advantageously, the Young's moduli $E_2$ and/or $E_4$ of the second and/or fourth materials are independently from 100 to 800 MPa, and preferably from 200 to 600 MPa.

Advantageously, the Water Vapour Transmission Rates (WVTR) of the second and fourth materials are as low as possible. In particular, the water vapour transmission rates of the second and/or fourth materials are, at room temperature of 20 to 25° C., lower than $10^{-4}$ g·m$^{-2}$·day$^{-1}$, preferably lower than $10^{-5}$ g·m$^{-2}$·day$^{-1}$.

Advantageously, the coefficients of thermal expansion $E_2$ and/or $E_4$ of the second and/or fourth materials are independently comprised between $200\cdot10^{-6}$/K and $700\cdot10^{-6}$/K, and preferably between $300\cdot10^{-6}$/K and $600\cdot10^{-6}$/K.

The second and fourth materials may be, independently from each other, any material suited to protect against water the active elements of the light slab. Advantageously, the second and fourth materials are identical.

The thickness of the first external encapsulating film and/or the second external encapsulating film may be independently comprised between 0.25 mm and 2.0 mm, preferably between 0.25 mm and 1.0 mm.

The internal encapsulating film has in particular for role, when it coats the active elements, to mechanically protect these latter, in particular by filling the volumes located between the active elements which are not necessarily contiguous. Advantageously, the Young's modulus $E_3$ of the third material is from 5 to 100 MPa, and preferably from 10 to 50 MPa. Advantageously, the coefficient of thermal expansion $CTE_3$ of the third material is comprised between $800\cdot10^{-6}$/K and $2000\cdot10^{-6}$/K, and preferably between $800\cdot10^{-6}$/K and $1400\cdot10^{-6}$/K.

The third material may be any other material suited to mechanically protect the active elements. The thickness of the internal encapsulating film may be comprised between 0.4 mm and 2.0 mm, preferably between 0.8 mm and 1.4 mm.

The second, third and fourth materials may be independently chosen in the group consisted by the thermal polyolefins such as that known as CVF, ethylene-vinyl acetate (EVA), thermoplastic polyurethan (TPU), a ionomer, a polycarbonate and an acrylic resin. The second and/or fourth materials may in particular be, independently, a ionomer, such as that marketed as Ionomer DG3 by Juraplast. The third material may in particular be a thermoplastic polyolefin or a (meth)acrylic resin.

In an embodiment, the first and fifth materials are identical and/or the second and fourths are identical. Advantageously, the thicknesses of the two protective films are identical or substantially identical and/or the thicknesses of the two external encapsulating films are identical or substantially identical. This allows obtaining a symmetrical slab, which offers an optimum mechanical protection of the active elements.

In a preferred embodiment, the active elements are coated in the internal encapsulating film.

In an embodiment, the slab comprises at least two active elements adapted to emit light, in particular at least two active elements adapted to emit light connected to each other. The number of active elements in the slab may in particular be equal to two, three, four, five, six, seven, eight, nine or ten or be comprised in any interval delimited by two of these values.

The active elements present in the slab are active elements adapted to emit light. The terms "active elements", "light active elements" and "active elements adapted to emit light" are used indifferently in the present application to refer to these elements. It may be in particular light-emitting diodes (LEDs) mounted on a semi-rigid or flexible conductive electronic circuit support such as a printed circuit board (PCB). As an alternative, it may be other elements adapted to emit light, for example OLEDs (organic light-emitting diodes), preferably on a support, individual LEDs, preferably on a support, or LED strips. Preferably, an active element adapted to emit light comprises at least one light element on a support allowing it to be powered. Advantageously, the thickness of the active elements is lower than 10 mm, better lower than 7 mm, ideally lower than 4 mm.

Advantageously, the active element comprises at least two light elements connected in parallel. This allows in particular continuity in case of breakdown because, contrary to the case in which the light elements would be connected in series, the failure, for example electric failure, of a light element does not affect the operation of the other light elements that are connected thereto.

The active elements may have a privileged lighting direction. The active elements may for example produce a tangential lighting, i.e. in a main direction forming an angle lower than 90° with the surface of the pavement (or the first protective film), in particular a lighting directed towards a motorist. The lighting may on the contrary be directed upward (main lighting direction perpendicular to the pavement surface) to be visible by pedestrians. A same slab may comprise active elements all having the same lighting direction. As an alternative, a same slab may comprise at least two active elements whose lighting directions are different. The lighting direction of the active elements in the slab may depend in particular on their position in the slab or in the pattern formed by the slab. Optical elements such as diffusers, reflectors, prisms and/or lenses may be integrated into the light slab, between the first protective film and the active elements, to optimize the light perception.

The colour of the light emitted by the active elements may be any colour suitable for the purpose. In an embodiment, the active element emits white light. In another embodiment, the active element emits a coloured light, for example a coloured light chosen in the group consisted by yellow light, blue light, red light and green light. In an embodiment, the active element emits a light of the same colour than the marking into which it is integrated, and/or of the same colour than the slab colour. In an embodiment, all the active elements of the slab emit the same colour. In another embodiment, the active elements of a same slab emit different colours.

The nature, colour, shape and/or relative position of the different active elements in the slab are modulable and may be adapted as a function of a pattern that is desired to be formed when all or part of the active elements emit light.

In an embodiment, at least one active element of the slab comprises a printed circuit board (PCB) on which is mounted at least one light-emitting diode (LED). When the active elements are LEDs mounted on a PCB support, the PCB support may have any shape. This method allows assembling the LEDs in a customized manner in terms, in particular, of LED alignment, LED spacing and/or LED orientation. The PCB support is preferably in the form of a comb comprising a base and at least two substantially parallel fingers. Such a comb shape makes it possible in particular to minimize the losses of material during the manufacturing of the PCB support. Indeed, the PCB support may be manufactured by forming on the same plate two interdigitated combs, which minimizes the losses of material. Moreover, the combs advantageously have pads (plus and minus terminals) at the ends of each digit, or even at each LED, in order to allow on the one hand cutting the assembly (PCB+LEDs) at the desired shape and size, down to the unitary element level comprising a LED alone on its PCB support, and on the other hand connecting the active elements between each other according to the desired shape and size, in particular to form a pattern. Advantageously, the digits of the comb are cuttable between each LED, which allows custom layout. For example, it may be a printed circuit support whose machining shape allows a simple cut, such as a comb-shaped printed circuit, comprising a base and at least two substantially parallel fingers on which are positioned light elements, in particular LEDs. Advantageously, each digit of the comb comprises an alignment of at least two light elements in the lengthwise direction of the finger and a single light element in the widthwise direction of the finger before cutting. The junction between two such active elements may be made simply by connecting the plus terminals or the minus terminals of the active element supports by any suitable connector, for example using a 5 mm-wide tined copper strip.

The films forming the layer stack of the slab according to the invention are, independently from each other, advantageously continuous, in particular the first protective film and/or the second protective film.

The obtained pattern may be a simple pattern, such as a line, a square or a rectangle, making it possible in particular to light up an area corresponding to a road marking, but it may also be a more complex pattern. For example, geometrical shapes, panels, patterns, guiding or directional arrows, zebras, predefined or dynamic messages may be displayed. The pattern can be obtained either with a single slab according to the invention, or by means of an assembly of several light slabs according to the invention. In an embodiment, the pattern is obtained with a number of slabs between 1 and 15 slabs, preferably between 1 and 10 slabs, in particular between 2 and 3 slabs. The pattern size is either defined in the standards in force, or defined according to the use case. A deformation such as an anamorphosis may be applied to the pattern in order for the pattern to be visible by the users, whatever their position and/or speed.

The slab according to the invention may be of any shape. Preferably, the slab according to the invention is rectangular in shape. Preferably, the slab width is higher than or equal to 10 cm. Preferably, the slab length is lower than or equal to 2 m.

One of the advantages of the invention is the colorimetric adaptation of the slab to what exists. Indeed, the slab used as a road marking element must appear, when the active elements are on, in the desired colour. Moreover, in certain configurations, it must provide, when the active elements are off, a rendering compliant with the road marking standards (for example the NF EN 1436). Therefore, in case of failure of the system or of its power supply, the road user will see a standard-compliant road marking. In other configurations, when the active elements are off, the rendering will on the contrary have to be of the same colour as the pavement, so that the user does not distinguish the slab from the surrounding pavement.

Therefore, advantageously, at least one among the first protective film, the second protective film and the at least one active element or a part of the latter is coloured. In the case where the active element is coloured, if it is a PCB support, on which LEDs are mounted, the PCB support may preferably be coloured. The colour may for example be black, i.e. bitumen colour, or white, green, blue or yellow, i.e. the colour of a road marking, in such a way that the slab is perfectly integrated in the marking when the active elements do not emit light. In the case of use on a trafficable pavement not constrained by the regulations in force in France, the usable colour range is larger and may have any desired shade of colour and/or textured.

In an embodiment, a suitable formulation with a judicious choice of transparent resin and paint or pigment proportion is used as the first material. For example, the transparent resin of the first material may include a proportion of pigments comprised between 0 and 50%, better between 0.2 and 10%, and ideally between 0.3 and 5% by mass relative to the total mass of the resin+pigment combination.

In a second embodiment, a suitable formulation with a judicious choice of resin and paint or pigment proportion is used as the fifth material, and/or at least a part of the active elements (support) is judiciously coloured. In this case, the first material may be as described in the above paragraph, or a transparent material.

In a third embodiment, a colour may be obtained by addition of a decorative sheet under the active elements.

The colour of the different parts of the light slab may be obtained in particular by incorporating paint and/or pigments of the suitable colour, for example pigments of $TiO_2$ for a white colour, into one of the components of said parts, for example into the matrix of said parts.

The assembly of the light elements such as the LEDs on the support, in particular PCB or strip, is chosen in such a way as to optimize the electric architecture, for example to allow an increase in voltage, in particular up to 12 volts, up to 24 volts or even up to 60 volts, while respecting the electrical standards in force, in particular the VLSV (Very Low Safety Voltage) standard. The space between the LEDs is chosen according to the intended use. Therefore, it may be chosen in such a way that a motorist perceives a homogeneous line and not a matrix display. For this purpose, in the travel direction, the inter-LED distance may be lower than 30 cm, better lower than 15 cm, ideally between 1 cm and 10 cm. As an alternative, if LED strips are used, the strips are oriented in the travel direction of the vehicles, which may be advantageous in particular in the case of road markings including two parallel lines.

The slab according to the invention is thin, which allows it to be easily incorporated into an existing pavement. For example, the slab has a thickness comprised between 1 mm and 10 mm, preferably between 3 mm and 5 mm.

A second object of the invention is a method for manufacturing a light slab, comprising successively:

a first protective film, arranged on the front face of the device, made of a first material, a first external encapsulating film, made of a second material, an internal encapsulating film, made of a third material, a second external encapsulating film, made of a fourth material, a second protective film, arranged on the rear face of the device, made of a fifth material, one of the films, chosen among the first external encapsulating film, the internal encapsulating film and the second external encapsulating film, coating at least one active element adapted to emit light, each active element adapted to emit light comprising at least one light element on a support allowing it to be powered, the method comprising the following steps:

(a) providing at least one active element adapted to emit light comprising at least one light element on a support allowing it to be powered, (b) positioning the at least one active element adapted to emit light on a stack comprising the second protective film and the second external encapsulating film, (c) laminating the internal encapsulating film on the at least one active element in such a way as to fill at least in part the spaces between the active elements with the material of the internal encapsulating film, and to cover at least partially the at least one active element with the material of the internal encapsulating film, and (d) laminating on the internal encapsulating film a stack comprising the first external encapsulating film and the first protective film.

In an embodiment, the manufacturing method is a method for manufacturing a slab according to the invention. All the features and embodiments detailed hereinabove for the slab of course apply to the manufacturing method according to the invention.

Advantageously, the at least one active element provided at step (a) is obtained by cutting according to a desired pattern a cuttable support on which at least one light element is mounted. The cutting process makes it possible to obtain customed active elements of any size and/or any shape. The cut may be made by any suitable technique known by the person skilled in the art, and may be made both along straight lines or along curved lines.

Advantageously, step (b) of the manufacturing method according to the invention comprises the fastening of at least one active element to the second protective film through the second external encapsulating film. This fastening allows a better positioning of the active elements in the slab, which is important for obtaining the desired final pattern. As an alternative, the active elements may be fastened to the second external encapsulating film. The fastening may include adding a fastening layer such as an adhesive layer between the active elements and the second external encapsulating film, or preforming the surface of the second encapsulating film before positioning the active elements. In a third embodiment, the positioning of the active elements in the slab is maintained by positioning spacers between the active elements, in particular between the digits of the PCB "comb", and/or by connecting said active elements two by two, preferably at the power supply "plus" and "minus" terminals.

A third object of the invention is using for manufacturing a light slab an active element comprising at least one light element mounted on a support allowing it to be powered, said support being obtained by cutting a cuttable support according to a desired pattern. Advantageously, the cuttable support is a cuttable printed circuit support. For example, it may be a printed circuit support whose machining shape allows a simple cut, such as a comb-shaped printed circuit, comprising a base and at least two substantially parallel fingers on which are positioned light elements, in particular LEDs. Advantageously, each digit of the comb comprises an alignment of at least two light elements in the lengthwise direction of the finger and a single light element in the widthwise direction of the finger.

A fourth object of the invention is a functionalized trafficable pavement, comprising a trafficable pavement on which is fastened at least one light slab according to the invention through a fastening layer, the first protective film of the light slab being possibly covered with a coating layer to allow the passage of pedestrians and/or vehicles, the coating layer allowing all or part of the light emitted by the light slab to pass and having a textured external surface. In the case in which the first protective film of the light slab is not covered with a coating layer, said first protective film preferably comprises texturing agents providing a certain grip.

The coating layer allows obtaining the desired grip properties for the functionalized pavement. For example, it may allow obtaining good tyre/road grip properties, such as those defined by the standard NF EN 1436 in particular. The coating layer may also allow obtaining the optical properties, such as desired luminance and/or retro-reflection properties.

These optical properties may be obtained in particular by a coating layer comprising a mixture of glass and/or corundum grains and/or beads, in a dosage from 10 to 1000 g/m$^2$, better from 50 to 500 g/m$^2$, ideally from 60 to 400 g/m$^2$. The particle-size of these elements is substantially comprised between 0 mm and 3 mm, better between 0.1 mm and 1.5 mm, ideally between 0.2 mm and 1 mm. Moreover, the coating layer may include retro-reflection enhancing elements, for example beads of a transparent material, whose optical index is comprised between 1 and 2.5, better between 1.1 and 2, ideally between 1.2 and 1.9. The dosage of these elements may be from 10 to 1000 g/m$^2$, better from 50 to 500 g/m$^2$, ideally from 60 to 400 g/m$^2$. The particle-size of these elements is comprised between 0 mm and 3 mm, better between 0.1 mm and 1.5 mm, ideally between 0.2 mm and 1 mm.

Advantageously, the slab is fastened to the trafficable pavement by at least one fastening layer, in particular an adhesive layer. The adhesive may be coloured, in order to contribute to the colorimetric integration of the slab to what exists, as described hereinabove. The usable colour shades and colouring techniques are as described hereinabove for the other parts of the slab likely to be coloured.

A last object of the invention is a method for manufacturing a functionalized trafficable pavement comprising the following steps:

(a') providing a light slab according to the invention or a light slab obtained by a manufacturing method according to the invention, (b') fastening the light slab on a trafficable pavement, using a fastening layer, (c') depositing a coating layer, on the first protective film of the light slab, to allow the passage of pedestrians and/or vehicles, the coating layer letting through all or part of the light emitted by the light slab and having a textured external surface.

In the present invention, the term "substantially" in relation to a value means an interval of plus or minus 10% around said value, preferably plus or minus 5%, in particular plus or minus 1%.

In the present invention, any interval is understood to be exclusive. Unless otherwise specified, the term "higher than" means "strictly higher than", and the term "lower than" means "strictly lower than".

In the present invention, the term "comprise" and its variations are understood not to be limiting, that is to say, they do not exclude the presence of other components or other steps. In particular embodiments, this term may be interpreted as "be essentially consisted of" or "be consisted of".

Of course, various other modifications may be made to the invention within the scope of the appended claims. The different features, alternatives and embodiments of the invention can be associated with each other according to various combinations, insofar as they are not incompatible or exclusive with respect to each other.

BRIEF DESCRIPTION OF THE DRAWINGS

Moreover, various other features of the invention emerge from the appended description made with reference to the drawings that illustrate non-limiting embodiments of the invention, and wherein.

It is to be noted that, in these figures, the structural and/or functional elements common to the different alternatives can have the same references numbers.

DESCRIPTION OF THE EMBODIMENTS

Figure 1:
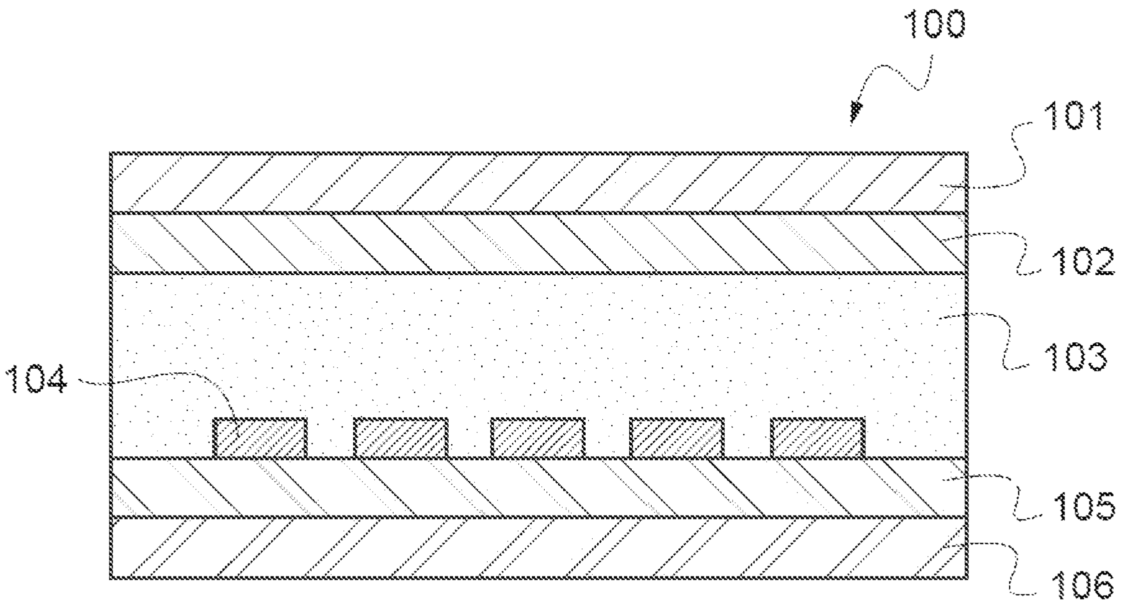
FIG. 1 is an overall view of a light slab according to the invention.

The light slab 100 shown in FIG. 1 is an overall representation of a slab according to the invention. It comprises a stack of a first protective film 101, a first external encapsulating film 102, an internal encapsulating film 103 that coats at least one active element 104, a second external encapsulating film 105, and finally a second protective film 106.

Figure 2:
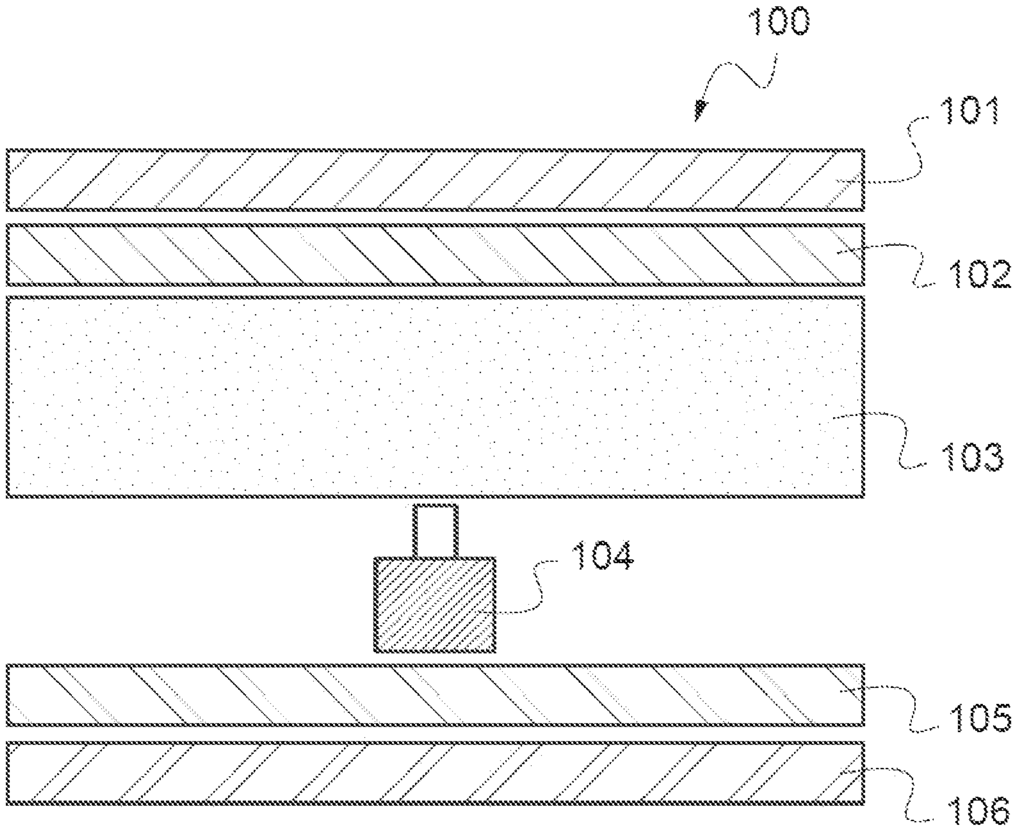
FIG. 2 is a diagram of a light slab according to the invention.

The light slab 100 shown in FIG. 2 comprises a stack of a first protective film 101 made of a prepeg material that is a composite of fibres and resin, such as a composite of epoxy resin and glass fibres, a first external encapsulating film 102 that acts as a moisture barrier to protect the active elements, an internal encapsulating film 103 made of a so-called soft encapsulating material, which coats at least one active element 104 including a printed circuit (PCB) support and a LED, a second external encapsulating film 105 that acts as a moisture barrier, and finally a second protective film 106 made of a prepeg material that is a composite of fibres and resin, such as a composite of epoxy resin and glass fibres.

Figure 3:
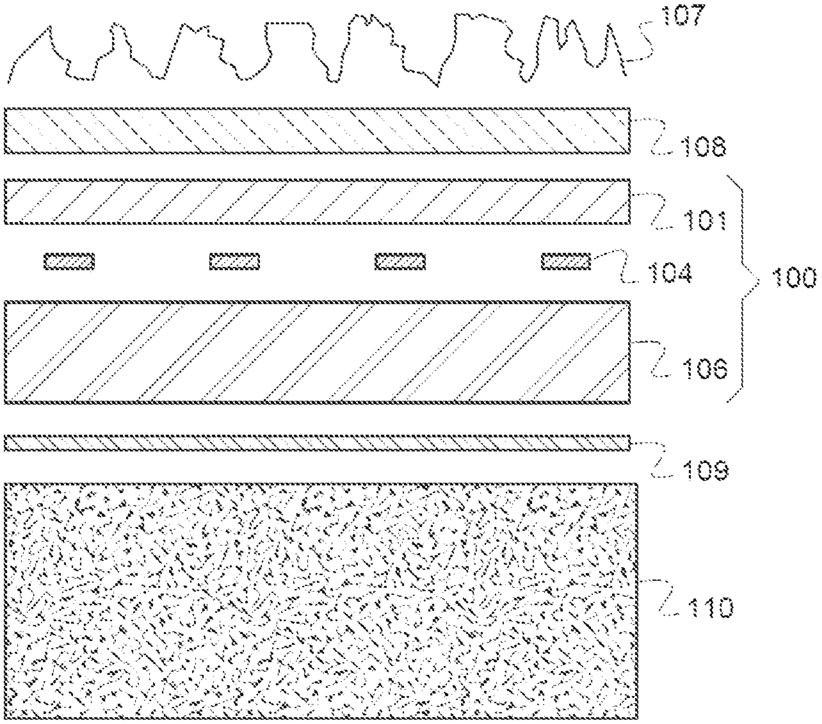
FIG. 3 is a diagram of a light slab according to the invention integrated into an existing pavement.

FIG. 3 shows the integration of a light slab 100 in an existing pavement. The light slab 100 is fastened to the pavement 110 through an adhesive resin layer 109. The light slab 100 is covered with a wearing layer 107 letting through all or part of the light emitted by the light slab 100 and having a textured external surface. The wearing layer 107 provides in particular the necessary grip for traffic on the functionalized pavement. Between the light slab 100 and the wearing layer 107 is present an interface layer 108 allowing for maximum compatibility between the wearing layer 107 and the first protective film 101. The interface layer 108 allows to promote grip (primer). In the embodiment of FIG. 3, the light slab 100 comprises in particular a first protective film 101 (front face), light active elements 104 and a second protective film 106 (rear face).

Figure 4:
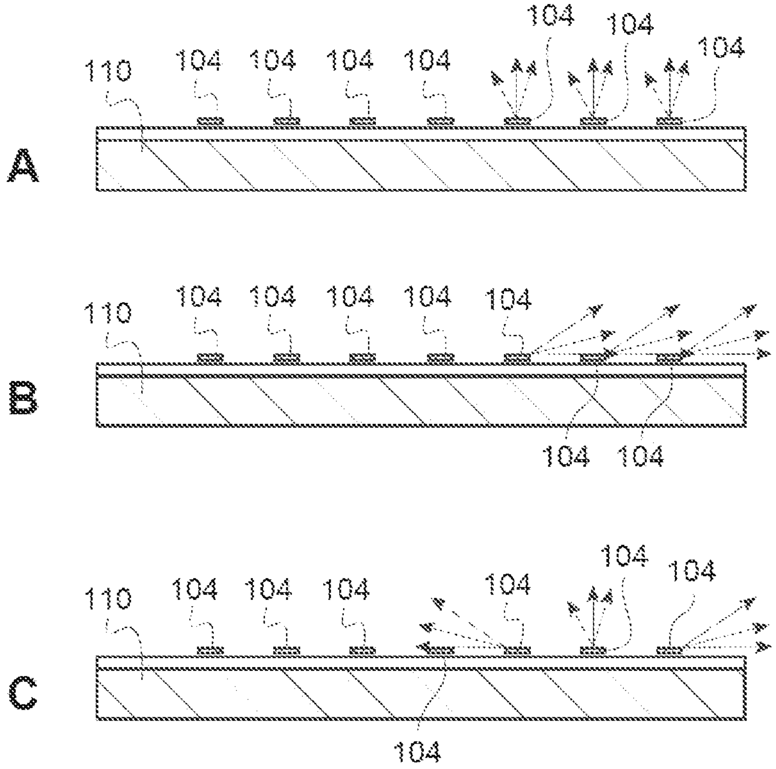
FIG. 4 is a diagram of different lighting modes that may be obtained with slabs according to the invention.

FIG. 4 shows three different lighting modes that may be obtained with a light slab according to the invention. Therefore, with a suitable control, the light elements 104 of the light slab may emit a so-called "normal" lighting, i.e. with a main direction of the light rays normal to the surface of the pavement 110, and a homogeneous distribution on either side of the latter (section A in FIG. 4). As an alternative, the light elements may emit a so-called "tangential" lighting, i.e. with a main direction of the light rays that forms an angle lower than 90°, in particular lower than 45°, with the surface of the pavement 110 (section B in FIG. 4). A so-called "mixed" lighting can also be obtained by combining light elements 104 emitting a normal lighting and light elements 104 emitting a tangential lighting (section C in FIG. 4). Of course, depending on the control, the lighting direction of each light element can be adapted to any desired direction.

Figure 5:
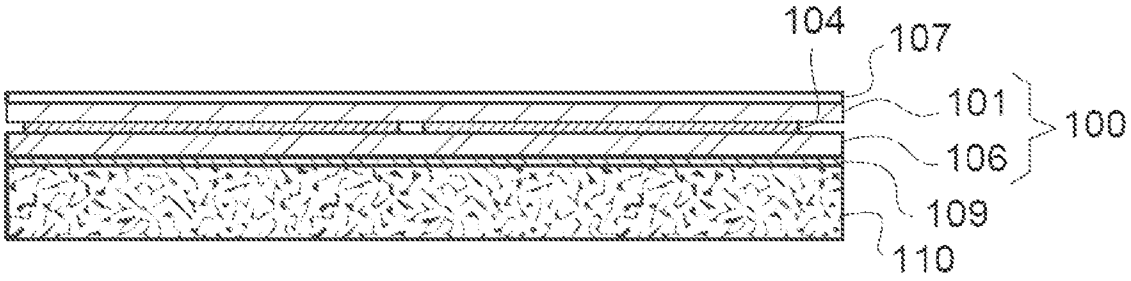
FIG. 5 is a non-coloured light slab according to the invention integrated in a pavement.
Figure 6:
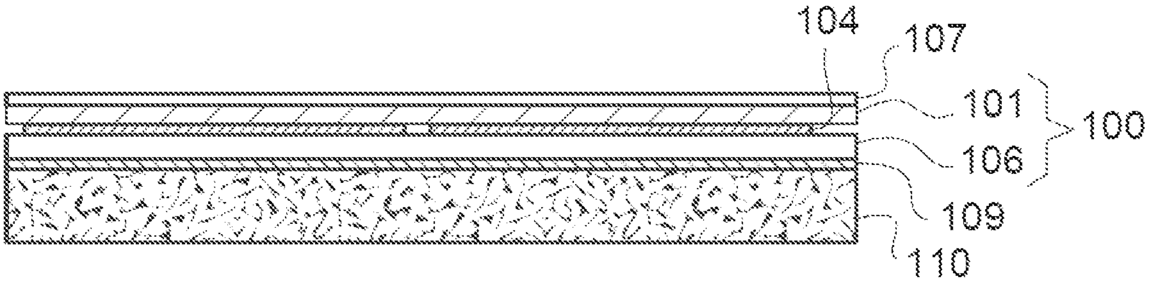
FIG. 6 is a light slab according to the invention coloured in white and integrated in a pavement.

FIG. 5 and FIG. 6 show embodiments in which the light slab 100 is either transparent (FIG. 5) or coloured, for example white (FIG. 6). The light slab 100 comprises a first protective film (front face) 101, LED light active elements 104 and a second protective film (rear face) 106. The second protective film 106 may be either translucent, as in the embodiment of FIG. 5, or coloured, in particular white, as in the embodiment of FIG. 6. The light slab 100 is covered with a translucent textured wearing layer 107, and fastened to the pavement 110 using an adhesive 109. As an alternative, the colour may be imparted to the slab by colouring other elements of the light slab integrated in the pavement, for example by colouring the PCB circuit of the active elements 104, or by colouring the adhesive 109.

Figure 7:
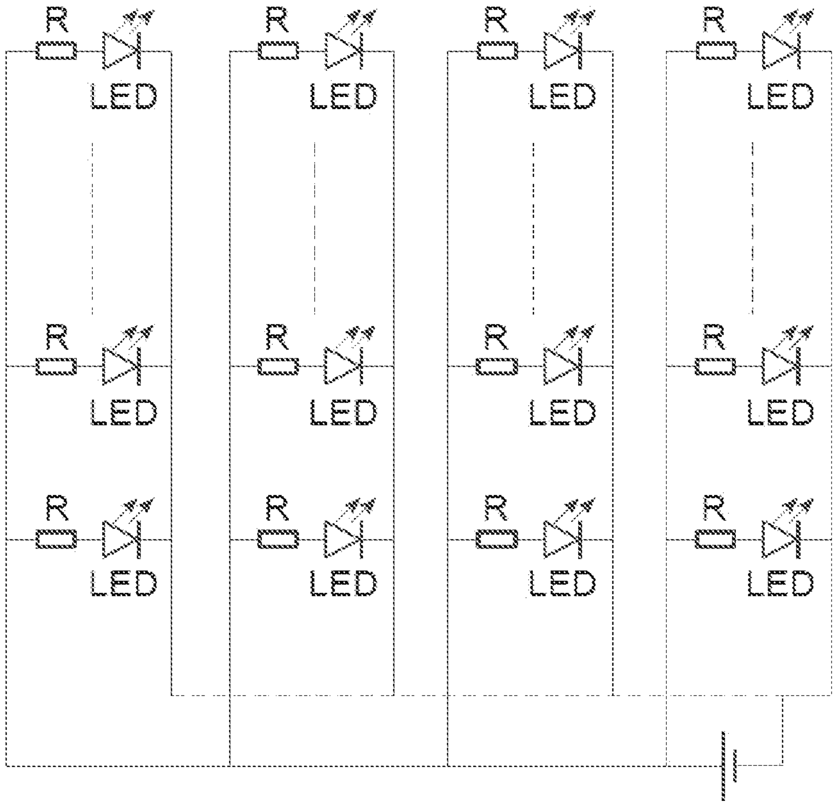
FIG. 7 is a light active element comprising LEDs and resistors arranged in parallel on a comb-shaped PCB support.

FIG. 7 shows the electric diagram of an active element 104 comprising, on a PCB support, LEDs connected to each other in parallel. The PCB has a comb shape that is optimum both as regards the optimization of the materials used during its manufacturing, and as regards the versatility of the accessible shapes and possible junctions. The light active element of FIG. 7 comprises a comb whose fingers all have the same length. However, each of the fingers of the comb may be, in the spirit of the invention, more or less shortened by simple cutting to obtain a desired pattern illuminated by the active element. If necessary, the cutting may go down to the level of the unitary LED on its support. Connecting the LEDs in parallel allows them to be independent. Each LED is coupled to a resistor.

Figure 8:
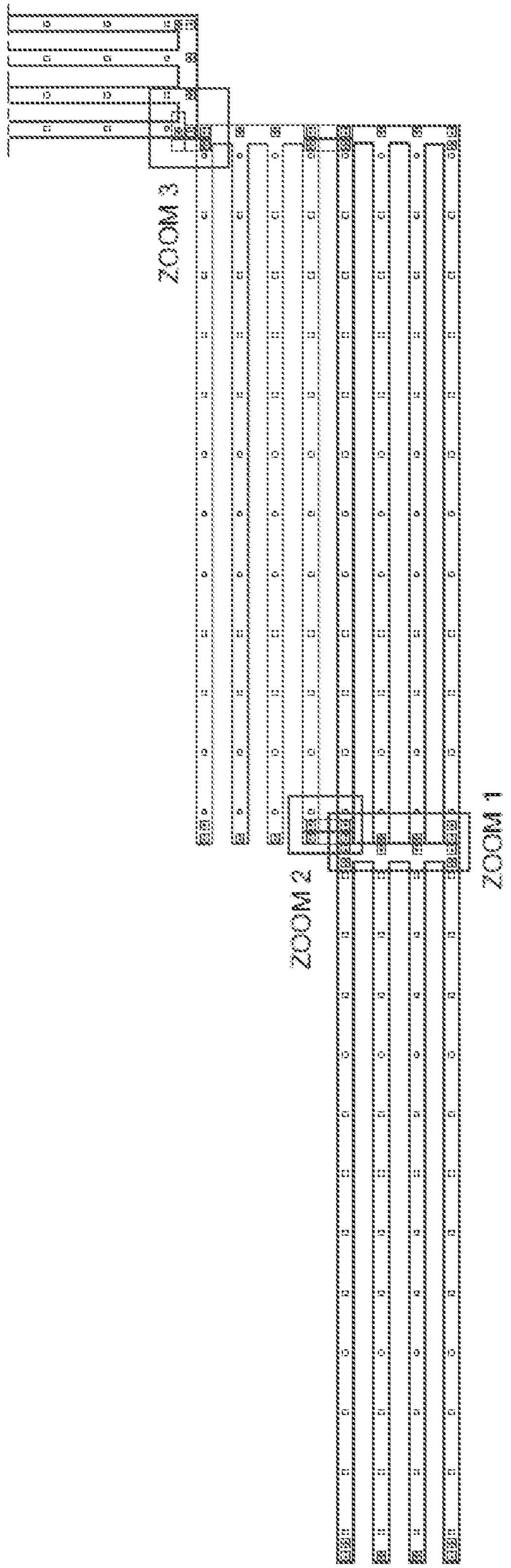
FIG. 8 is an overall diagram showing different modes of connection of the PCBs between each other.
Figure 9:
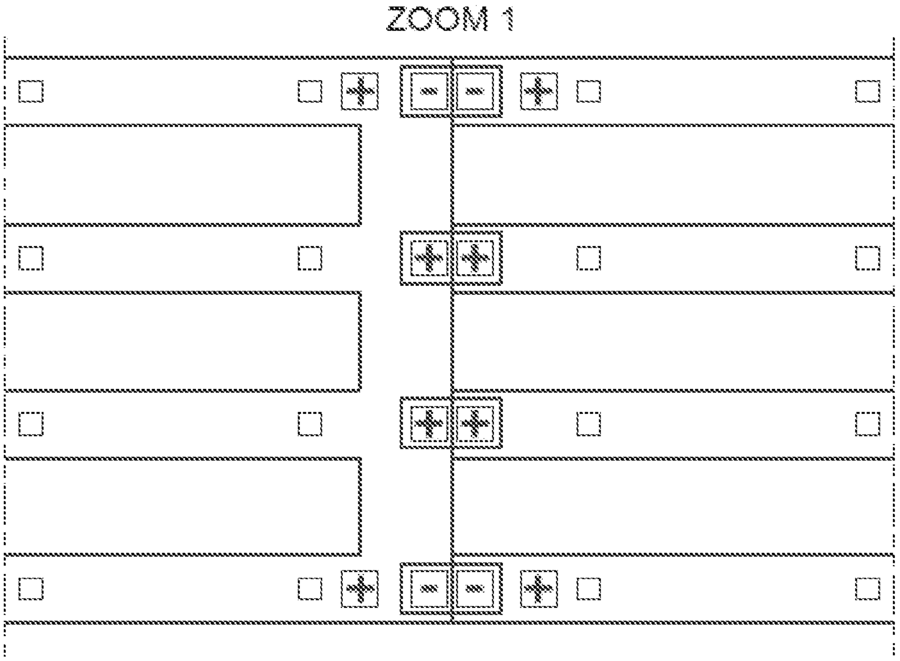
FIG. 9 is a connection diagram of the area designated as "Zoom 1" in FIG. 7.
Figure 10:
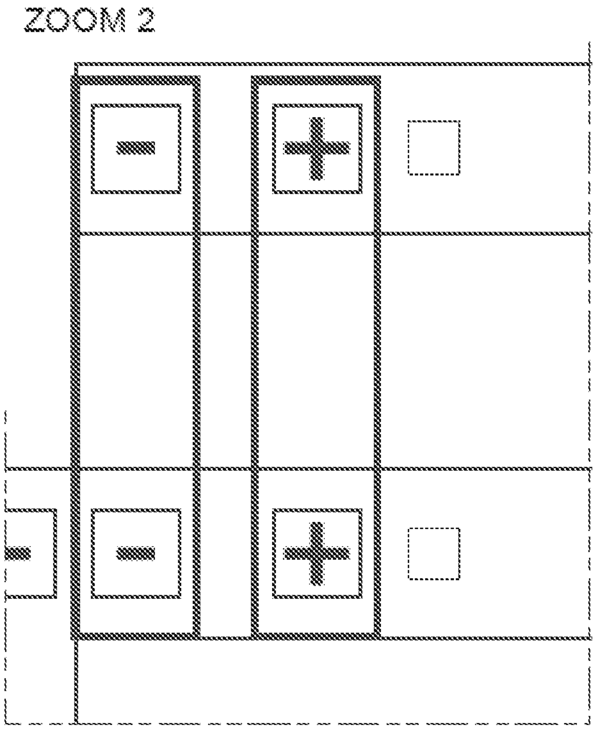
FIG. 10 is a connection diagram of the area designated as "Zoom 2" in FIG. 7.
Figure 11:
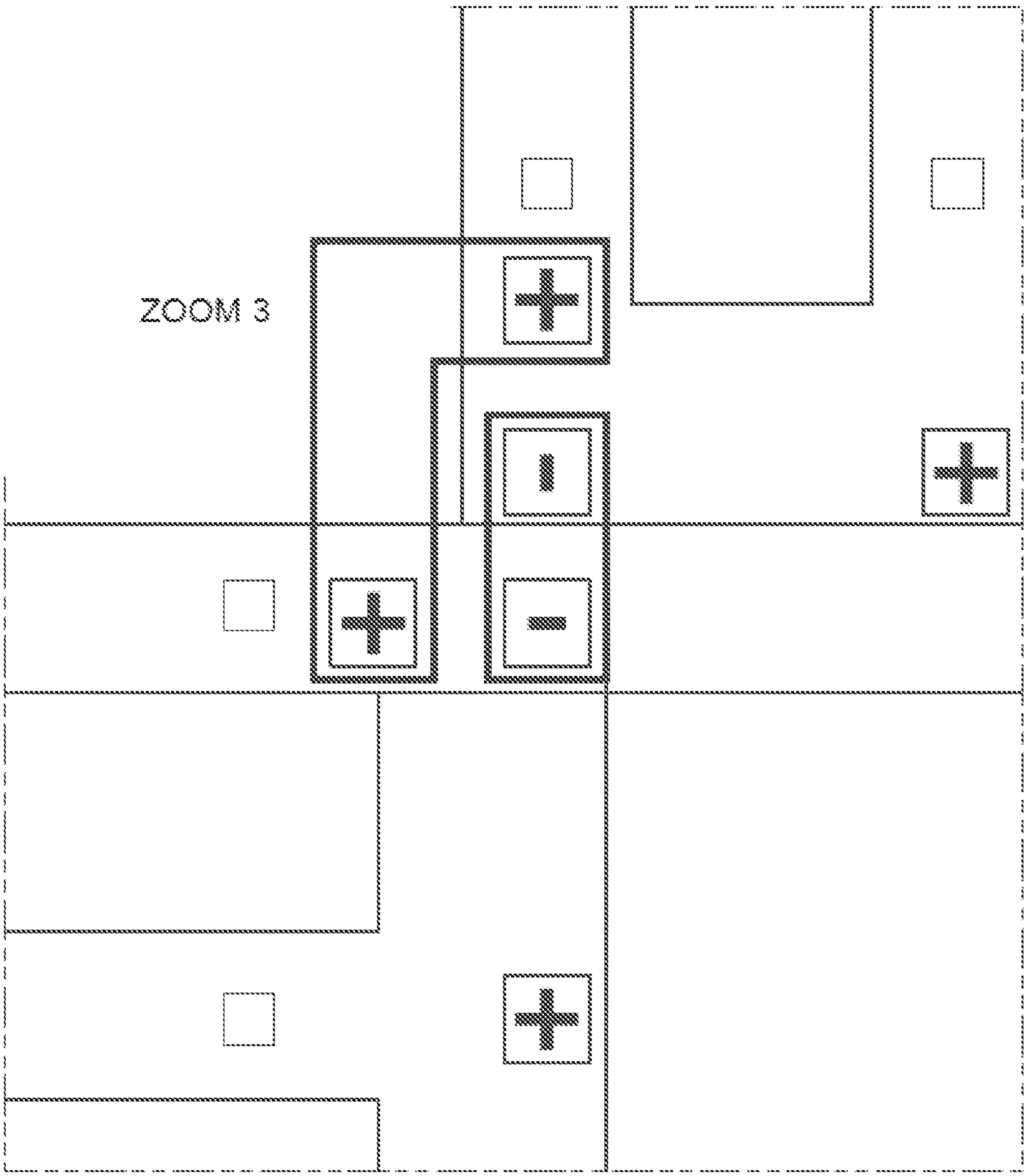
FIG. 11 is a connection diagram of the area designated as "Zoom 3" in FIG. 7.

FIG. 8 is a diagram illustrating the simplified connection to each other of several light active elements including PCB supports according to the invention, wherein the connections can be made as well between two comb-shaped PCB bases, between the base of a comb-shaped PCB and the end of the fingers of another PCB (zoom 1, also shown in FIG. 9), between the ends of the fingers of two PCBs (zoom 2, also shown in FIG. 10), or between the bases of two comb-shaped PCBs, in particular perpendicular to each other (zoom 3, also shown in FIG. 11). The connections between PCB can be made using a tined copper strip, in particular a 5 mm-wide tined copper strip.

The invention claimed is:

1. A light slab able to be integrated into a trafficable pavement, comprising in succession:

a first protective film, arranged on a front face of the slab, made of a first material;

a first external encapsulating film, made of a second material;

an internal encapsulating film, made of a third material;

a second external encapsulating film, made of a fourth material; and a second protective film, arranged on a rear face of the slab, made of a fifth material, one of the films, chosen among the first external encapsulating film, the internal encapsulating film and the second external encapsulating film, coating at least one active element adapted to emit light, each active element comprising at least one light element on a support allowing the at least one light element to be powered, and the first material, the second material, the third material, the fourth material, and the fifth material having Young's moduli $E_1$, $E_2$, $E_3$, $E_4$, and $E_5$, respectively, and coefficients of thermal expansion $CTE_1$, $CTE_2$, $CTE_3$, $CTE_4$, and $CTE_5$, respectively, values of $E_1$ and $E_5$ differing by no more than 30%, values of $E_2$ and $E_4$ differing by no more than 30%, $E_1>E_2$ and $E_4<E_5$, $CTE_1$ and $CTE_5$ differing by no more than 30%, $CTE_2$ and $CTE_4$ differing by no more than 30%, $CTE_1<CTE_2$ and $CTE_4>CTE_5$.

2. The light slab according to claim 1, wherein the at least one active element comprises at least two light elements connected in parallel.

3. The light slab according to claim 2, wherein at least one among the first protective film, the second protective film and the at least one active element or a part of the at least one active element is coloured.

4. The light slab according to claim 2, wherein the at least one active element comprises a printed circuit on which at least one light-emitting diode is mounted.

5. The light slab according to claim 2, wherein at least one of the first material and the fifth material is a composite comprising glass fibres and an epoxy resin.

6. The light slab according to claim 1, wherein at least one among the first protective film, the second protective film and the at least one active element or a part of the at least one active element is coloured.

7. The light slab according to claim 6, wherein the at least one active element comprises a printed circuit on which at least one light-emitting diode is mounted.

8. The light slab according to claim 6, wherein at least one of the first material and the fifth material is a composite comprising glass fibres and an epoxy resin.

9. The light slab according to claim 1, wherein the at least one active element comprises a printed circuit on which at least one light-emitting diode is mounted.

10. The light slab according to claim 9, wherein the printed circuit is formed of a comb comprising a base and at least two substantially parallel fingers.

11. The light slab according to claim 1, wherein at least one of the first material and the fifth material is a composite comprising glass fibres and an epoxy resin.

12. The light slab according to claim 1, wherein at least one of the second material and the fourth material is an ionomer.

13. The light slab according to claim 1, wherein the third material is a thermoplastic polyolefin or a (meth)acrylic resin.

14. The light slab according to claim 1, wherein a thickness of at least one of the first protective film and the second protective film is comprised between 0.1 mm and 5.0 mm.

15. The light slab according to claim 1, wherein a thickness of at least one of the first external encapsulating film and the second external encapsulating film is comprised between 0.25 and 2.0 mm.

16. The light slab according to claim 1, wherein a thickness of the internal encapsulating film is comprised between 0.4 and 2.0 mm.

17. A functionalized trafficable pavement, comprising a trafficable pavement on which is fastened at least one light slab according to claim 1, using a fastening layer, the first protective film of the light slab being covered with a coating layer, to allow the passage of pedestrians and/or vehicles, the coating layer letting through all or part of the light emitted by the light slab and having a textured external surface.

18. A method for manufacturing a light slab that has, successively, a first protective film arranged on a front face of the slab and made of a first material, a first external encapsulating film made of a second material, an internal encapsulating film made of a third material, a second external encapsulating film made of a fourth material, and a second protective film arranged on a rear face of the slab and made of a fifth material, one of the films, chosen among the first external encapsulating film, the internal encapsulating film and the second external encapsulating film, coating at least one active element adapted to emit light, and each active element having at least one light element on a support allowing the at least one light element to be powered, the method comprising the following steps:

(a) providing at least one active element adapted to emit light comprising at least one light element on a support allowing the at least one light element to be powered;

(b) positioning the at least one active element adapted to emit light on a stack comprising the second protective film and the second external encapsulating film;

(c) laminating the internal encapsulating film on the at least one active element in such a way as to fill at least in part the spaces between the active elements with the material of the internal encapsulating film, and to cover at least partially the at least one active element with the material of the internal encapsulating film; and (d) laminating on the internal encapsulating film a stack comprising the first external encapsulating film and the first protective film.

19. The method for manufacturing a slab according to claim 18, wherein the at least one active element provided at step (a) is obtained by cutting according to a desired pattern a cuttable support on which at least one light element is mounted.

20. The method for manufacturing a slab according to claim 18, wherein step (b) comprises fastening of at least one active element to the second protective film through the second external encapsulating film.

* * * * *